United States Patent
Sijstermans

(10) Patent No.: US 6,438,676 B1
(45) Date of Patent: Aug. 20, 2002

(54) DISTANCE CONTROLLED CONCATENATION OF SELECTED PORTIONS OF ELEMENTS OF PACKED DATA

(75) Inventor: Fransiscus W. Sijstermans, Mountain View, CA (US)

(73) Assignee: TriMedia Technologies, Milpitas, CA (US)

(*) Notice: Subject to any disclaimer, the term of this patent is extended or adjusted under 35 U.S.C. 154(b) by 0 days.

(21) Appl. No.: 09/366,709

(22) Filed: Aug. 4, 1999

(30) Foreign Application Priority Data

Aug. 6, 1998 (EP) .............................. 98202647
Oct. 7, 1998 (EP) .............................. 98203382

(51) Int. Cl.[7] .............................. G06F 15/80
(52) U.S. Cl. .................. 712/22; 708/203; 708/209; 712/221; 712/300
(58) Field of Search .............. 708/209, 203; 712/22, 224, 300

(56) References Cited

U.S. PATENT DOCUMENTS 5,423,010 A * 6/1995 Mizukawi ..................... 341/60
5,859,790 A * 1/1999 Sidwell ........................ 708/607
5,951,624 A * 9/1999 Gray et al. ................... 708/203
6,052,769 A * 4/2000 Huff et al. ...................... 712/3
6,098,087 A * 8/2000 Lemay ......................... 708/209
6,275,834 B1 * 8/2001 Lin et al. ...................... 708/209

FOREIGN PATENT DOCUMENTS

| WO | WO9617289 | 6/1996 |
|----|-----------|--------|
| WO | WO9732278 | 9/1997 |
| WO | WO9733222 | 9/1997 |

* cited by examiner

*Primary Examiner*—Kenneth S. Kim
(74) *Attorney, Agent, or Firm*—Fenwick & West LLP

(57) ABSTRACT

A data processor uses storage units that are subdivisible into predetermined fields for executing instructions that cause the data processor to handle numbers from respective ones of the fields separately. The processor has an instruction that addresses a first and a second one of the storage units. In response the data processor takes a first and second group of successive bits from a first and second one of the fields of the first one of the storage units, places the first and second groups of successive bits at respective shifted positions both in the same field in a result storage unit, a bit position distance between the shifted positions being controlled by a content of the second one of the storage units.

16 Claims, 3 Drawing Sheets

DISTANCE CONTROLLED CONCATENATION OF SELECTED PORTIONS OF ELEMENTS OF PACKED DATA

BACKGROUND

A. Technical Field

The invention relates to a data processor, a method of processing data and a method of compiling a program for a data processor.

B. Background of the Invention

Various signal processing applications use compressed data in which different signal values are represented by different numbers of bits. This is the case for example when Huffman coding is used.

When different numbers of bits are used, compression involves selecting the required number of bits from each signal value and placing the selected bits in a compressed word. Decompression involves taking the compressed word and obtaining decompressed signal values from selected groups of bits from the compressed words. The selection of a group for a number depends on the length of bits that has been used in the compressed word for the preceding numbers and on the length of bits used for the number itself.

Compression and decompression can be performed by a program that runs on a data processor. This will involve executing several instructions, for example for shifting register contents, combining register contents and masking undesired register contents.

PCT patent application WO 96/17289 describes a data processor that is capable of executing shift instructions that operate on registers that hold storage units made up of packed data. A register that contains packed data is organized into a number of equal length fields, for example four fields of sixteen bits. The data processor has an instruction set that contains a packed shift instruction for shifting a plurality of numbers by specified amounts. This shift instruction has two operands. A first operand contains several amount codes that specify a required amount of shift, each for a respective number in a second operand. The amount codes are stored as packed data in a first register and the numbers are stored as packed data in a second register. The processor generates a packed result, containing the various numbers from the second operand, each shifted by its own amount specified in the first operand. Thus, a single instruction can be used to cause the processor to execute a plurality of shift operations on different numbers.

The packed shift instruction may be used to reduce the number of instructions for variable length compression or decompression, but more than one instruction must still be used to compress or decompress a signal value.

Amongst others, it is an object of the invention to provide for a data processor which is capable of performing compression and/or decompression on packed data with fewer instructions.

SUMMARY OF THE INVENTION

According to one aspect of the invention, the data processor is arranged as set forth in claim 1. Thus, the processor has a compression instruction which refers to two storage units, such as two operand registers, a first register containing one or more codes that specify relative amount(s) of shift that have to be applied to respective numbers in the second operand register. The relative amount(s) correspond for example to the lengths of bits to which respective numbers in a second operand register must be compressed. The numbers come from different fields in the second operand and the result may be placed in one of these fields or another field of a result operand. By using this instruction in programs for compressing data, the number of instructions needed for compression can be reduced. This saves execution time and reduces the memory space needed to store the program.

According to another aspect of the invention, the data processor is arranged as set forth in claim 2. Thus, the processor has a decompression instruction which refers to two storage units, such as two operand registers, a first register containing one or more length codes, which specify the lengths of bits to which respective numbers in a second operand register must be decompressed. By using this instruction in programs for decompressing data, the number of instructions needed for compression can be reduced. This saves execution time and reduces the memory space needed to store the program.

Some processors use different functional units for executing instructions from different subsets of the instruction set, such as VLIW (Very Long Instruction Word) processors, which contain for example one or more functional units for executing arithmetic/logic instructions, one or more functional units for executing shift instructions. These functional units may each be dedicated to one way of subdividing a register content into different fields, or multi-purpose, capable of handling several different subdivisions into fields. In a VLIW processor these different functional units may start executing different instructions, each from its own subset in parallel According to another aspect of the invention, the instructions for placing the first and second group of bits is implemented using a functional unit for executing shift instructions. The shift circuits that are used for shifting the content of fields individually is used to shift the groups of bits in or from the same field.

These and other advantageous aspects of the data processor and methods according to the invention will be described in a non-limitative way using the following drawing, in which

DETAILED DESCRIPTION OF THE PREFERRED EMBODIMENTS

Figure 1:
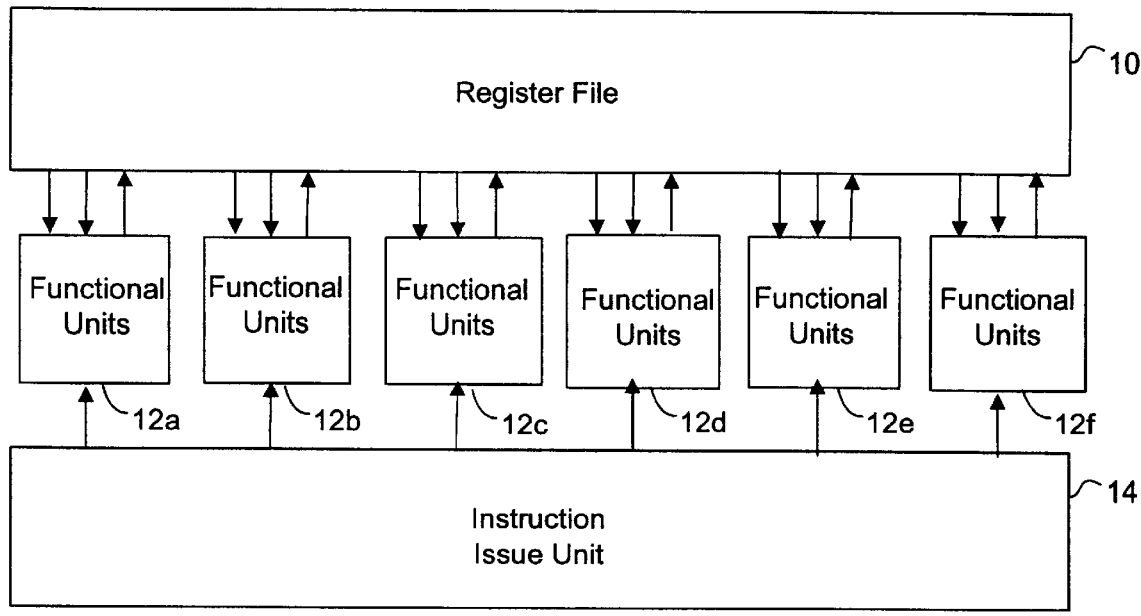
FIG. 1 shows a data processor

FIG. 1 shows the architecture of a data processor. By way of example a VLIW processor has been shown, although the invention is not limited to VLIW processors. The processor contains a register file 10, a number of functional units 12a–f and an instruction issue unit 14. The instruction issue unit 14 has instruction issue connections to the functional units 12a–f. The functional units 12a–f are connected to the register file 10 via read and write ports.

In operation, the instruction issue unit 14 fetches successive instructions words from an instruction memory (not shown explicitly). Each instruction word may contain several instructions for the functional units 12a–f.

Figure 2:
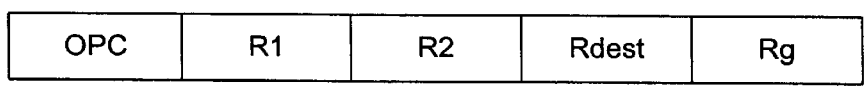
FIG. 2 shows a format of an instruction

FIG. 2 shows an example of an instruction. The instruction contains a number of fields, viz. a field OPC for an opcode, a field R1 for a first source register address, a field R2 for a second source register address, a field Rdest for a result register address and optionally a field Rg for a guard register address.

The instruction issue unit 14 issues individual instructions from the instruction word in parallel to respective ones of the functional units 12a–f. In response to the instructions the contents of the source registers address in the fields R1, R2 for source register addresses are fetched from the register file 10. The functional unit 12a–f processes the instruction according to the opcode from the field for the opcode and a result of processing is written back into the register file 12 in the register address by the address in the field for the result register address Rdest. Optionally, writing back is conditional on the content of the register addressed by the field Rg for the guard register address.

Normal instructions use the content of each of the source registers and the destination register as a single number. For example, if the registers are 64 bit long, a normal "ADD" instruction causes a functional unit 12a–f to add two 64 bit numbers loaded from the source registers in the register file 10 and places a 64 bit result in the destination register in the register file 10. Similarly a normal shift instruction causes a functional unit 12a–f to shift bits through a 64 bit register. Execution of such normal instructions requires a step for loading data from the register file 10, a step for executing the relevant operation and a step for writing the result.

In addition, one ore more functional units 12a–f are capable of executing instructions the use the content of the registers as packed data.

Figure 3:
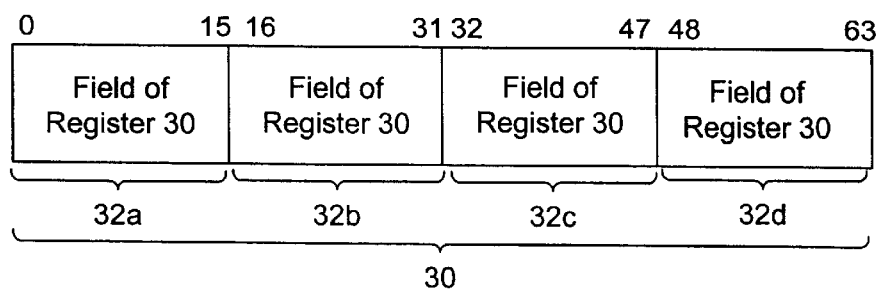
FIG. 3 shows a packed data format

FIG. 3 shows a packed data format. The data format shows a possible register content. The register content 30 is subdivided into four equal length fields 32a–d of bits. By way of example, the register content may consist of 64 bits and each field may consist of 16 bits.

When a functional unit 12a–f executes certain instructions, it treats the data in the source and/or destination registers of those instructions as packed data. For example, in case of an add instruction, pairs of corresponding fields 32a–d may be added, each pair consisting of one field from the first source register and one field from the second source register. In this example, the result of the addition of each pair is written to a respective one of the fields 32a–d in the destination register. The additions of different pairs are independent, so there is no carry interaction from one field to another.

The number of steps needed for executing an instruction that treats the content of registers as packed data is generally the same as that needed for executing a normal instruction, so that in the same time a multiple of operations can be performed. Generally speaking, one step is used for loading the content of the source registers (that is, all of the packed data is loaded in one step in the same time-span as used for loading the content of a register that is treated as a single number. Generally speaking, one step is used for executing the relevant operations, i.e. the operations on different packed numbers from one register are executed in parallel. Generally speaking one step is used for writing into the destination registers, that is, all of the packed data is written in one step in the same time-span as used for writing the content of a register that is treated as a single number.

According to the invention the data processor has at least one functional unit 12a–f that has an instruction designed to speed up compressing and decompressing packed data.

Figure 4A:
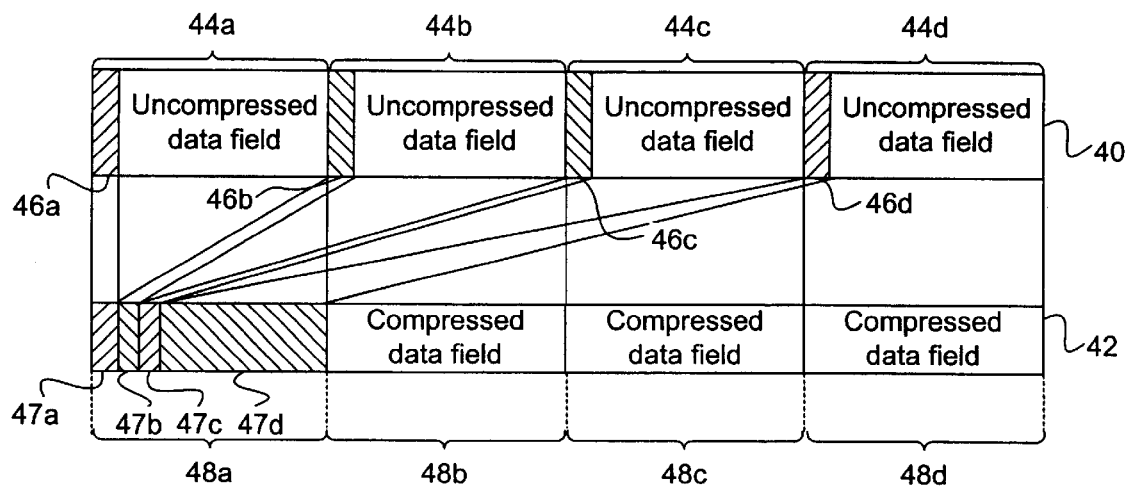
FIGS. 4a, 4b, 4c, 4d, and 4e show compressed data and uncompressed data

FIG. 4a shows an uncompressed data format 40 and a compressed data format 42. Both formats spatially show bit positions. The uncompressed data format 40 corresponds to a packed format with equal length fields 44a–d, but with parts 46a–d of the fields 44a–d separately indicated. In the compressed data format 42 the same fields 48a–d are shown, with shifted parts 47a–d. Successive bits in the shifted parts 47a–d are derived from successive bits in corresponding parts 46a–d.

The bits from successive shifted parts 47a–d have been concatenated, so that bits from more than one field of the uncompressed data format 40 occur in the same field of the compressed data format 42. By "concatenation" of two shifted parts 47a–d is meant that the bits of one shifted part 47a–d follow the bits of another shifted part 47a–d each time at a distance of a predetermined number of bits (preferably directly, at a distance of zero bits), so that the position of a shifted part 47a–d in the register depends on the sum of the variable lengths of the fields that precede it.

FIG. 4a also shows a correspondence between the parts 46a–d of the fields 44a–d of the uncompressed data format 40 and the variable length fields 48a–d of the compressed data formats. In principle, only the content of the parts 46a–d appears in the compressed data 42; the remainder of the fields 44a–d of the uncompressed data format 40 does not appear in the compressed data format 42.

Figure 4B:
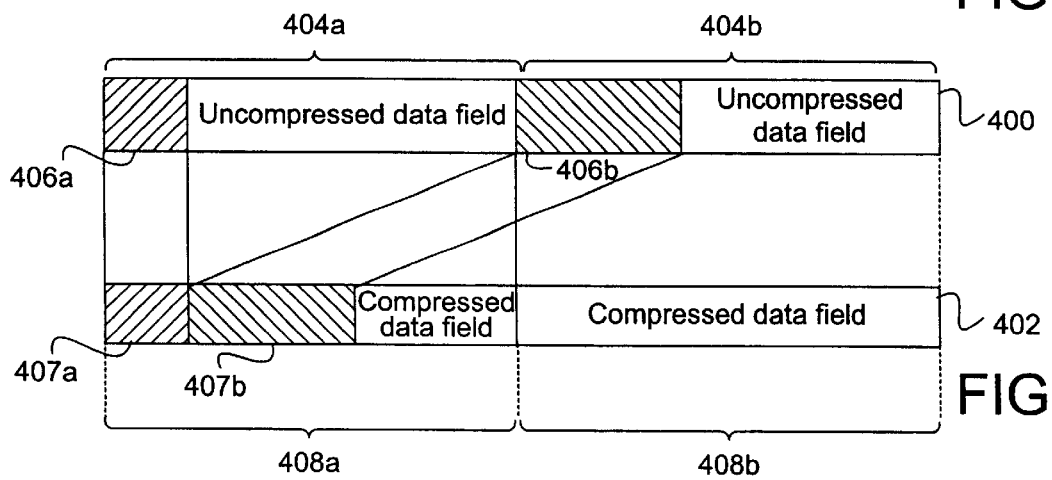

FIG. 4b shows a similar combination of an uncompressed data format 400 and a compressed data format 402. The uncompressed data format 400 has equal length fields 404a,b with parts 406a,b. The compressed data format 402 has the same subdivision into fields 408a,b with shifted parts 407a,b.

Figure 4C:
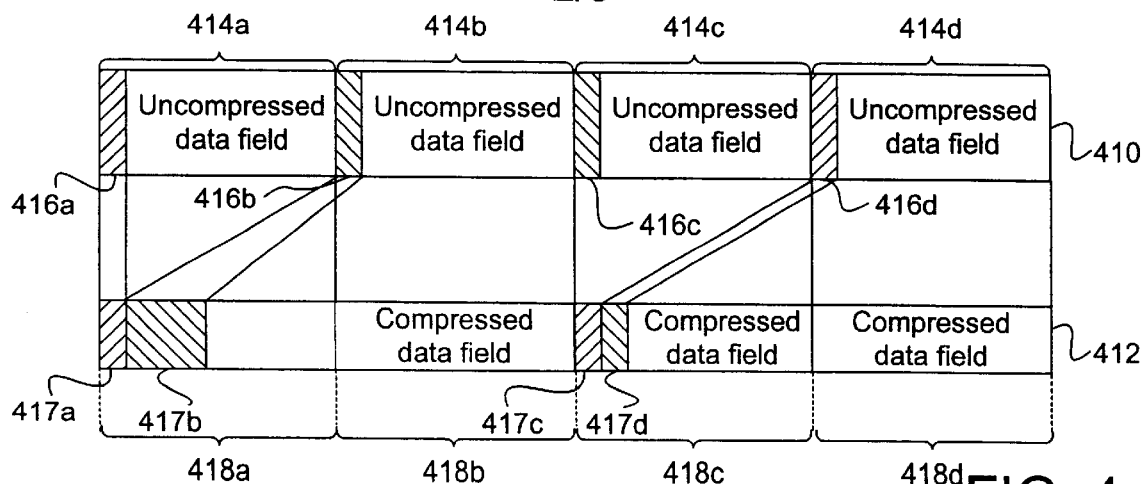

FIG. 4c shows a further similar combination of an uncompressed data format 410 and a compressed data format 412. The uncompressed data format 410 has equal length fields 414a–d with parts 416a–d. The compressed data format is subdivided into the same fields 418a–d and contains shifted parts 417a–d. The fields 414a–d of the uncompressed data format 410 are treated as pairs 414a,b 414c,d. Each pair is treated in the same way as a complete data format of FIG. 4b.

Figure 4D:
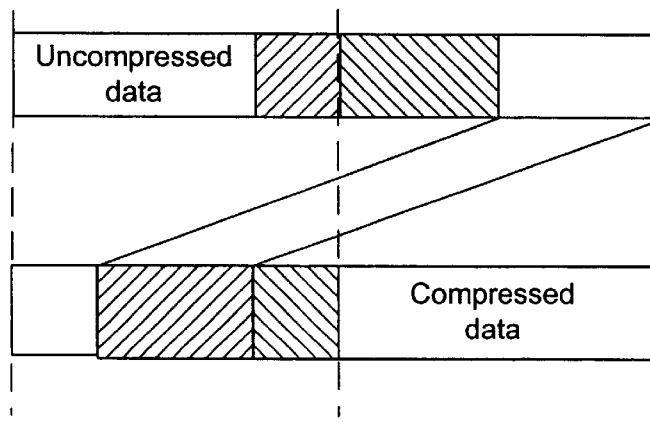
Figure 4E:
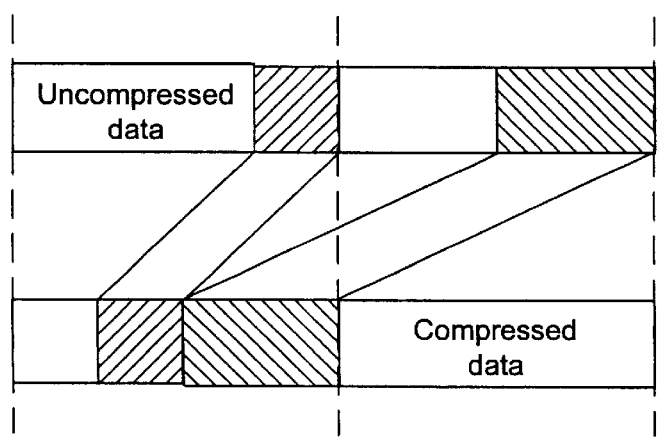

FIGS. 4d,e show further possible combinations of uncompressed data formats and compressed data formats, which differ from FIGS. 4a–c in that the parts are concatenated in a different sequence and that the parts are aligned with a different field border.

Conversion from the uncompressed data format 40, 400, 410 and the compressed data format 42, 402, 412 and back, is used for example in variable length compression and decompression. In this case it is known that only a number of bits of field 44a–d is needed, for example because the other bits are zero, or because the other bits do not distinguish between different signal values (as in the case of arithmetic coding for example).

According to the invention, the processor is provided with a processing element that is capable of executing an instruction or instructions for use in compression (conversion between the uncompressed packed format 40 or 400 to the compressed format 42 or 402) and/or decompression:

Bitconcat R1,R2,R3

Bitsplit R1,R2,R3

The compression instruction "Bitconcat" uses two source registers R1, R2. A first source register R1 is in packed format. Fields of the first register R1 contain one ore more length codes, for example numbers representing the number of bits in the parts 46a–d, 406a,b 416a–d of the fields 44a–d, 404a,b 414a–d, starting from a field border. The second source register R2 contains the data in packed, uncompressed format 40, 400, 410. In response to the compression instruction the functional unit writes data in the compressed format 42, 402 to the destination register R3. That is, for example for the case of FIG. 4b with 64 bit registers, the functional unit sets:

R3 bits 0 to R1[0]−1 equal to bits 0 to R1[0] of R2

R3 bits R1[0] to R1[0]+R1[1]−1 equal to bits 32 to 32+R1[1] of R2

Here and elsewhere in this description, R1[0], R1[1] etc. denote the content of different fields of a register R1 (e.g. R1[0] bits 0–31, R1[1] bits 32–63 in case of 64 bit registers with two fields). Of course, the specific bit positions described herein are a matter of convention. If numbers are represented in a different way (for example with a different sequence from least significant to most significant, or with different field sizes) the bit positions will be correspondingly different. Also, the values in R1 need not be numbers that directly equal lengths, but they may for example equal field size-length or any length code from which a length can be derived.

For the case of FIG. 4a, the functional unit sets R3 as follows:

R3 bits 0 to R1[0]−1 equal to bits 0 to R1[0] of R2

R3 bits R1[0] to R1[0]+R1[1]−1 equal to bits 16 to 16+R1[1] of R2

R3 bits R1[0]+R1[1] to R1[0]+R1[1]+R1[2]−1 equal to bits 32 to 32+R1[2] of R2

R3 bits R1[0]+R1[1]+R1[2] to R1[0]+R1[1]+R1[2]+R1[3]−1 equal to bits 48 to 48+R1[3] of R2

R1[0], R1[1] etc. denote the content of different fields of R1 (e.g. R1[0] bits 0–15, R1[1] bits 16–31, R1[2] bits 32–47 etc. in case of 64 bit registers with four fields).

These operations may be realized by OR-ing a number of shifted versions of the second source register R2. For example, in case of FIG. 4b Bitconcat produces:

R3= mask(0,R1[0],R2)

OR mask(32,32+R1[1],R2)<<(32−R1[0])

Herein, mask(x,y,R) denotes masking (replacing by zero) the bits of register R, except the bits at from the positions x to y−1. "A<<B" denotes shifting the bits of A by B positions; OR A B denotes bitwise OR: if C=OR A B, then the bit from C at position 0 is the logic OR of the bits from A and B at position 0 and so on for the other positions.

In case of FIG. 4a the OR can be used as follows:

R3= mask(0,R1[0],R2)

OR mask(16,16+R1[1],R2)<<(16−R1[0])

OR mask(32,32+R1[2],R2)<<(16−R1[0]−R1[1])

OR mask(48,48+R1[3],R2)<<(16−R1[0]−R1[1]−R1[2])

For FIG. 4c:

A=mask(0,R1[0],R2) OR mask(16,16+R1[1],R2)<<(16−R1[0]))

B=mask(32,R1[2],R2) OR mask(48,48+R1[3],R2)<<(16−R1[2]))

R3=mask(0,32,A) OR mask(32,64,B)

When it is known that those bits from a field that are masked out are already zero in the source register R2, then the mask operations may be replaced by selection operations which select the bits from specific fields. For example, in case of FIG. 4b

R3= select0(R2)

OR mask(select1(R2)<<(32−R1[0])

Here the selection operators select0 and select1 select bits 0–31 and bits 32–64 in case of a 64 bit register with two 32 bit fields. These selection operations do not need a variable length parameter like R1[0] and are therefore easier to implement.

If the Bitconcat instruction is implemented in this way, it may be necessary to include a "MASK_OP" instruction in the instruction set of at least one of the functional units 12a–f.

MASK_OP R1,R2,R3

The functional unit 12a–f that executes this instruction treats the content of the source registers R1, R2 and the destination register R3 as packed data in equal length fields. The fields of the first source register R1 contains lengths codes coding the number of bits that must be masked. The fields of the second source register R2 contain the data to be masked. The functional unit 12a–f writes packed and masked data to the destination register:

R3[0]=mask(0,R1[0],R2[0])

R3[1]=mask(0,R1[1],R2[1]) etc.

If the bits of the source register R2 that are masked out are not guaranteed to be zero, a program for compression reads in this case

MASK_OP R1,R0,R2

Bitconcat R1,R2,R3

Of course, when it is known that the bits to be masked are always zero, the MASK_OP may be omitted. This is the case in many compression programs. The Bitconcat operation that includes a mask is therefore advantageous in that the number of instructions required for compression is smaller. The Bitconcat operation without a mask is advantageous in that it is easier to implement and faster; however an additional MASK_OP instruction may be needed, but this is not always the case.

The decompression instruction essentially performs the inverse the compression instruction. Therefore, FIGS. 4a–c also illustrate the operation of the decompression instruction, where the remainder of the uncompressed data format 40, 400, 410 is preferably filled with zeros.

According to the invention, at least one functional unit 12a–f of the processor has an instruction set which contains an instruction for decompression. This instruction works with packed data, just as the instruction for compression. Just as for compression, one step is used in execution for executing the relevant operations, i.e. the operations on different packed numbers from one register are executed in parallel. Generally speaking one step is used for writing into the destination registers, that is, all of the packed data is written in one step in the same time-span as used for writing the content of a register that is treated as a single number.

In programs the decompression instruction is denoted by

Bitsplit R1,R2,R3 this instruction has a first and second source register R1, R2 and a destination register R3. The content of the first source register R1 and the result register R3 are treated as fields of packed data R1[0], R1[1] etc. and R3[0], R3[1] etc.

The effect of various versions of the Bitsplit instruction will be described using a "expand" function. Expand(a,b,R) takes "b" bits from a register R, starting from bit position "a" and produces a result which starts with these b bits followed by padded zeros. For example, a decompression operation as shown in FIG. 4b (using packed data with two fields) has the effect of R3[0]=expand(0,R1[0],R2)
R3[1]=expand(R1[0],R1[1],R2)

It is not always needed to pad the result with zeros at the bit positions that do not derive from the operands. For example, if those bits do not lead to any significant effect at other places in a program. If padding with zeros is not needed, the Bitsplit instruction may be realized by

R3[0]=R2[0]
R3[1]=R2[0]<<R1[0]

When the functional unit provides only this implementation of the Bitsplit instruction without padding, and a case occurs where padding is needed, the program may provide for padding including a MASK_OP:

Bitsplit R1,R2,R3
MASK_OP R1,R3,R4

In the example of FIG. 4a decompression using packed data with four fields has the effect R3[0]=expand(0,R1[0],R2)
R3[1]=expand(R1[0],R1[1],R2)
R3[2]=expand(R1[0]+R1[1],R1[2],R2)
R3[3]=expand(R1[0]+R1[1]+R1[2],R1[3],R2)

Alternatively, in FIG. 4c the four fields may be treated as two pairs of the type described for FIG. 4b:

R3[0]=expand(0,R1[0],R2)
R3[1]=expand(R1[0],R1[1],R2)
R3[2]=expand(32,32+R1[0],R2)
R3[3]=expand(32+R1[0],32+R1[1],R2)

(In this example the registers have been taken to be 64 bits wide). In all these cases, "expand" may be replaced by different shift operations operating on the same source field in case padding with zeros is not needed.

Figure 5:
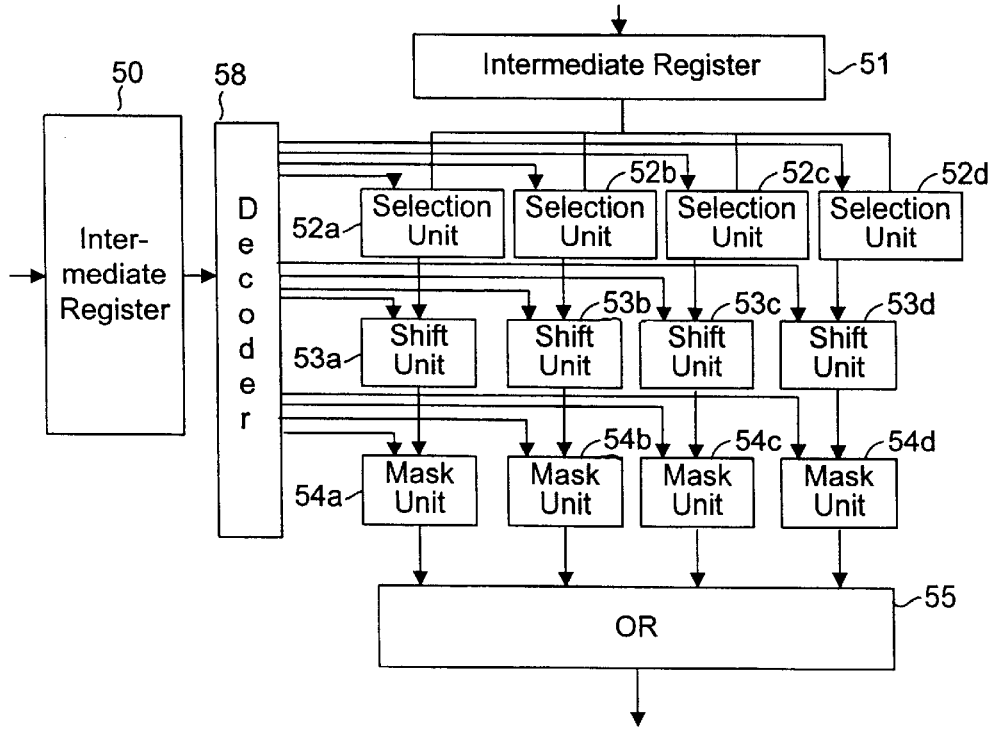
FIG. 5 shows a functional unit for executing instructions including an instruction for compressing and decompressing data.

FIG. 5 shows an example of a functional unit for performing the compression and/or decompression instruction. The functional unit contains a first intermediate register 50 and a second intermediate register 51. The functional unit contains a four parallel cascades coupled to an output of the second intermediate register 51. Each cascade contains successively a selection unit 51a–d, a shift unit 52a–d, and a mask units 53a–d. The outputs of the mask units 53a–d are coupled to an OR unit 54. Furthermore, the functional unit contains an instruction decoder 58. The instruction decoder 58 has inputs coupled to an instruction input and to an output of the first intermediate register 50. Outputs of the instruction decoder 58 are coupled to control inputs of the selection units 51a–d, the shift units 52a–d and the mask units 53a–d.

The functional unit shown in FIG. 5a is capable of executing various shift instructions and the instructions for compressing and decompressing variable length encoded data according to the invention.

In operation, when the processor executes an instruction, the opcode is supplied to the instruction decoder 58. The operand addresses are supplied to the register file and the operand addressed by those addresses are loaded into the first and second intermediate register 50, 51 respectively.

The instruction decoder 58 uses the opcode to determine whether the second operand in the second intermediate register 51 should be treated as a single number or as a packed operand and, if the latter is the case, into which fields the second operand should be divided.

The selection units 52a–d each selects a field of bits from the second operand and pass the bits of the selected fields to the shift units 54a–d; other bits are made zero. Depending on the desired number of fields, the decoder 58 supplies selection signals to the selection units 53a–d to control the field and the size of the field that each selection unit 53a–d selects. For example the first and second selection unit 53a,b may select a first and a second half of the bits of the second operand respectively, or the first to fourth selection unit 53a–d may select successive quarters of the second operand.

The shift units 54a–d shift the bits they receive from the selection units 53a–d. In principle, each shift unit 53a–d provides for as many bits as the intermediate register 51. The amount of shift effected by each shift unit 53a–d is determined by the first operand, which is stored in the first intermediate register 50, and by the opcode. Each shift unit 54a–d may shift its bits by a different amount.

The mask units 54a–d pass only the bits of specific fields from the shift units 53a–d to the OR unit; other bits are made zero. The specific field is selected by a signal supplied from the instruction decoder 58, as required by the opcode.

The OR unit 55 performs a bitwise OR of the outputs of the shift units 54a–d. That is, each bit of a word output by a shift unit 54a–b is logically OR-ed with bits from corresponding positions in the words output by the other shift units 54a–d. The output of the OR unit 55 forms the result of processing by the functional unit and is coupled to a write port of the register file, for writing a result into the result register addressed by the instruction.

The functional unit is capable of performing various kinds of shift instructions, dependent on the opcode. For example, in response to an opcode that requires a normal shift on the content of the second operand as a whole, the instruction decoder may control the first selection unit 52a to select all of the bits from the second intermediate register 51, whereas the other shift units are controlled to select no bits at all;

the shift amount may be passed from the first intermediate register 50 to the control input of the first shift unit 53a the first mask unit 54a receives a control signal to pass all bits from the first shift unit 53a to the OR unit 55; the other mask units 54b–c pass no bits. Similarly, in response to an opcode that requires separate shifts on individual numbers from different fields in the second operand:

each selection unit 52a–d may be controlled to select the bits from a respective field of the second intermediate register 51 (e.g. a first and a second half of the second operand or a first, second, third and fourth quarter);

shift amounts may be passed from respective fields in the first intermediate register 50 to the control inputs of respective shift units 53a–d;

the mask units 54a,b receive control signals to pass respective fields of bits from the first and second shift unit 53a,b to the OR unit 55. More particularly, upon receiving a "bitconcat" instruction for a compression as shown in FIG. 4a, the instruction decoder will:

cause the first and second selection unit 53a,b to select a first and second field from the second operand determine a shift amount by decrementing a length of the first field by a desired length of bits in the first field as determined from a length code in the first operand supply the shift amount as shift control signal to the second shift unit 54b and a zero shift amount to the first shift unit 54a cause the first and second mask unit 54a,b to pass only the bits of first field from both the first and the second shift unit 53a,b.

Thus, bits from the second field are concatenated at a variable distance behind bits from the first field. Other opcodes, for executing different bitconcat instructions, for example to concatenate pairs of fields from four fields in the second operand, or for example to concatenate fields of a different size may be realized with appropriate control signals. Similarly, variable numbers of bits from more than two fields may be concatenated. In the latter case, the first operand may contain successive sums 0, 11, 11+12, 11+12+13 of the lengths 11, 12, 13 of the groups of bits in respective fields of the second operand. In this case these sums may be used to control the amounts of shift by the shift units 53*a–d*. Alternatively, the lengths 11, 12, 13 themselves may be present in the first operand, in which case the instruction decoder 58 may itself determine the sums.

Upon receiving an opcode that codes for a bitsplit instruction, for a decompression as shown in FIG. 4*a*, the instruction decoder 58 will:

cause the first and second selection unit 53*a,b* to select a first field from the second operand determine a shift amount by decrementing a length of the first field by a desired length of bits as determined from a length code in the first operand supply the shift amount as shift control signal to the second shift unit 54*b* and a zero shift amount to the first shift unit 54*a* cause the first and second mask unit 54*a,b* to pass only the bits of first and second field from the first and the second shift unit 53*a,b* respectively.

To suppress undesired bits from the first field of the result produced by the split instruction, this split instruction is preferably followed by a MASK_OP instruction. Similarly, to suppress interference from undesired bits from the first field of the second operand of the bitconcat instruction, this bitconcat instruction may be preceded by a MASK_OP instruction.

Alternatively, the select units 52*a–d* and/or the mask units 54*a–d* may be provided so that an adjustable number of bits inside a field starting from the beginning of the field is selected or passed. In this case, the instruction decoder 58 may supply the length codes from fields of the first operand in the first intermediate register to the select units 52*a–d* and/or mask units 53*a–d* to control the number of bits as needed to suppress undesired bits. With such an implementation no additional mask instruction is necessary.

Alternatively, the function of the MASK_OP may be included in the functional unit, so that no additional MASK_OP instruction is needed.

For example, four mask generation units (not shown) may be added to the functional unit, together with bitwise AND circuits (not shown) between mask units 54*a–d* and OR unit 55. In this case there is a mask generation unit for each mask unit 54*a–d*. Each mask generation unit generates has a respective bit mask for each bit of the field selected by its corresponding mask unit 54*a–d*. The mask generation units receive information about the length codes from the first operand, and generate mask bits that are logically "1" for a number of successive bits at bit positions determined by the received length code, where the MASK_OP as described passes bits, the remaining mask bits being logically "0". These mask bits are bitwise AND-ed with the output of the mask units 54*a–d* and the result is fed to the OR-unit 54.

Thus, bits that should not contribute to the result can be masked out. Generation of the mask bits requires a circuit with a complexity that is similar to that of the shift units 53*a–d* and that can operate in parallel with those shift units, so that the execution of the instruction is delay only marginally by the bitwise AND units.

It will be clear that, without deviating from the invention, various implementations of the functional unit can be realized, with or without mask units, with a larger or smaller number of fields, larger or smaller registers etc.

For example, one might use a functional unit that contains an instruction decoder and a respective N-input multiplexer for each of the N output bits of the result, each multiplexer having inputs coupled to N respective ones of the bits of the second operand (plus optionally to a logic 1 and a logic 0 input). The instruction decoder controls each of the multiplexers individually, dependent on the opcode and the length codes in the fields of first operand, so that in case of a bitconcat or bitsplit instruction the bits from appropriate inputs are fed to bits of the output. The instruction decoder might be implemented as a ROM addressed by the opcode and the least significant bits of the length codes, with NlogN-bit data words to control each multiplexer. Instead of the ROM an equivalent logic circuit may be used. In principle, such a functional unit could realize any reshuffling of bits, but of course if N is large (say 64 bit) only a small number of reshufflings may be realized, reshufflings corresponding to bitconcat and/or bitsplit being among the realized reshufflings.

With such a functional unit it is possible to execute programs that compress data by placing bits from different fields together in the same field. That same field can subsequently be used for example to transmit or store the data, using only that field instead of the plurality of fields from which the data is derived. Subsequently, the data may be decompressed by splitting the data into more than one field. When this kind of program implements the compression and decompression with the bitconcat and bitsplit instruction, the number of instructions needed for compression and decompression is reduced, so that the program is faster and smaller.

What is claimed is:

1. A data processor which uses storage units that are identically subdivisible into predetermined fields for executing instructions that cause the data processor to handle numbers from respective ones of the fields separately, an instruction set of the processor comprising an instruction with locations for addressing a first and a second one of the storage units, the data processor being arranged to respond to the instruction by taking a first and second group of successive bits from a first and second one of the fields of the first one of the storage units respectively, placing the first and second groups of successive bits at respective shifted positions in a result storage unit, a bit position distance between the shifted positions being controlled by a content of the second one of the storage units, characterized in that the first and second group are placed both in a third one of the fields in a result storage unit.

2. A data processor according to claim 1, wherein the first and second group start from borders of the first and second one of the fields respectively, the first group being placed at a position starting from a corresponding border of the third field, a position of the second group relative to the corresponding border being controlled by said content of the second one of the storage units.

3. A data processor according to claim 1, comprising a plurality of functional units, each for executing its own subset of the instruction set, a first one of the functional units for executing a subset containing shift instructions being arranged to execute said instruction.

4. A data processor according to claim 3, the first one of the functional unit comprising respective shift circuits, each for shifting contents of a respective one of the fields in shift instructions that shift the fields individually, the instruction being implemented using at least one of said shift circuits for shifting said first group.

5. A data processor according to claim 1, the data processor being arranged to respond to said instruction by taking a third and fourth group of successive bits from a fourth and fifth one of the fields, different from the first and second one of the fields, of the first one of the storage units respectively, and placing the third and fourth groups of successive bits at respective shifted positions both in a fourth one of the fields in the result storage unit, a bit position distance between the shifted positions being controlled by a content of the second one of the storage units.

6. A data processor which uses storage units that are identically subdivisible into predetermined fields for executing instructions that cause the data processor to handle numbers from respective ones of the fields separately, an instruction set of the processor comprising an instruction that has locations for addressing a first and a second one of the storage units, the data processor being arranged to respond to the instruction by taking a first and second group of successive bits from the first one of the storage units, a bit position distance between positions from which the first and second group are taken from the first one of the fields being controlled by a content of the second one of the storage units;

placing the first and second groups of successive bits at predetermined positions in different fields in a result storage unit, characterized in that the first and second group are both taken from a first one of the fields of the first one of the storage units.

7. A data processor according to claim 6, wherein the first group is taken from a position starting at a border of the first field, the second group being taken from a position relative to the border determined by said content of the second one of the storage units, the first and second group being placed at corresponding borders of the first and second one of the fields respectively.

8. A data processor according to claim 6, comprising a plurality of functional units, each for executing its own subset of the instruction set, a first one of the functional units for executing a subset containing shift instructions being arranged to execute said instruction.

9. A data processor according to claim 8, the first one of the functional unit comprising respective shift circuits, each for shifting contents of a respective one of the fields in shift instructions that shift the fields individually, the instruction being implemented using at least one of said shift circuits for shifting said first group.

10. A data processor according to claim 6, the data processor being arranged to respond to said instruction by taking a third and fourth group of successive bits both from a second one of the fields in the first one of the storage units, a further bit position distance between positions from which the third and fourth and second group are taken from the second one of the fields being controlled by a content of the second one of the storage units; placing the third and fourth groups of successive bits at predetermined positions in further different fields in the result storage unit.

11. A method of processing data with a data processor that uses storage units that are identically subdivisible into predetermined fields for executing instructions that cause the data processor to handle numbers from respective ones of the fields separately, the method comprising loading an instruction that addresses a first and a second one of the storage units, loading the fields of the first and second storage units taking a first and second group of successive bits from a first and second one of the fields loaded from the first one of the storage units respectively, placing the first and second groups of successive bits at respective shifted positions in a result storage unit, a bit position distance between the shifted positions being controlled by a content of the second one of the storage units, characterized in that the first and second group are placed both in a third one of the fields in a result storage unit.

12. A method according to claim 11, wherein the result storage unit is used to store and/or transmit information from the first and second one of the fields in compressed form, using a variable number of bits, variable under control of said content of the second one of the storage units.

13. A method of processing data with a data processor that uses storage units that are identically subdivisible into predetermined fields for executing instructions that cause the data processor to handle numbers from respective ones of the fields separately, the method comprising loading an instruction that addresses a first and a second one of the storage units, loading the fields of the first and second one of the storage units, taking a first and second group of successive bits from the fields of the first one of the storage units, a bit position distance between positions from which the first and second group are taken from the first one of the fields being controlled by a content of the second one of the storage units;

placing the first and second groups of successive bits at predetermined positions in different fields in a result storage unit, characterized in that the first and second group are both taken from a first one of the fields of the first one of the storage units.

14. A method according to claim 13, wherein the result storage unit is used to read and/or receive compressed information in the one of the fields, wherein the compressed information is coding using a variable number of bits, and expanding said compressed information into the different fields.

15. A method of compiling a computer program for a data processor as described in claim 1, the computer program including coding data words by variable numbers of bits, the method including generating a further instruction for placing a first and a second data word into the first and second field of a storage unit and generating said instruction to combine the data words with a variable number of bits.

16. A method of compiling a computer program for a data processor as described in claim 6, the computer program including decoding data words coded by variable numbers of bits in a code word, the method including generating said instruction to separate the code word into the data words.

* * * * *